United States Patent [19]
Mayumi et al.

[11] Patent Number: 5,243,270
[45] Date of Patent: Sep. 7, 1993

[54] CHARGING CONTROL APPARATUS FOR VEHICLE GENERATORS

[75] Inventors: Nobuo Mayumi, Toyohashi; Tomoni Tsuzuki, Toyota; Kouzi Tanaka, Anjo, all of Japan

[73] Assignee: Nippondenso Co., Ltd., Kariya, Japan

[21] Appl. No.: 618,309

[22] Filed: Nov. 28, 1990

[30] Foreign Application Priority Data

Nov. 29, 1989 [JP] Japan .................... 1-309950

[51] Int. Cl.⁵ ............................... H02J 7/04
[52] U.S. Cl. .......................... 320/64; 322/99
[58] Field of Search ...................... 320/64; 322/99

[56] References Cited

U.S. PATENT DOCUMENTS

| | | | |
|---|---|---|---|
| 3,538,361 | 11/1970 | Hilterbrick et al. | 310/68 |
| 4,419,597 | 12/1983 | Shiga et al. | 310/68 D |
| 4,451,774 | 5/1984 | Akita et al. | 320/64 |
| 4,459,489 | 7/1984 | Kirk et al. | 290/13 |
| 4,477,766 | 10/1984 | Akita et al. | |
| 4,590,414 | 5/1986 | Mayumi et al. | 320/64 |
| 4,634,954 | 1/1987 | Kato et al. | 320/64 |
| 4,636,706 | 1/1987 | Bowman et al. | 322/28 |
| 4,641,079 | 2/1987 | Kato et al. | 320/64 |
| 4,831,322 | 5/1989 | Mashino et al. | 320/64 |
| 4,937,514 | 6/1990 | Iwatani | 322/23 |

FOREIGN PATENT DOCUMENTS 0009895 4/1980 European Pat. Off. .
0118779 9/1984 European Pat. Off. .
0339576 11/1989 European Pat. Off. .
49-38107 4/1974 Japan .

Primary Examiner—Steven L. Stephan
Assistant Examiner—Thomas M. Dougherty
Attorney, Agent, or Firm—Cushman, Darby & Cushman

[57] ABSTRACT

A battery charging control apparatus for a vehicle generator comprises switching means for controlling a field current flowing through a field winding of the generator intermittently, voltage control means for controlling the switching means to increase the field current gradually in order to maintain a voltage of a battery to be charged at a first predetermined value when the battery voltage drops below the first predetermined value, generator output voltage detecting means for detecting an output voltage of the generator, charging abnormality warning means, which detects occurrence of charging abnormality, when the detected generator output voltage drops to assume a second predetermined value and below, which value is lower than the first predetermined value, and at the same time the battery voltage remains at the first predetermined value and below for a predetermined time, and which then turns on a charging abnormality warning lamp, and current increasing means which increases the field current to thereby increase the generator output voltage to assume the second predetermined value and above within the predetermined time, when the charging abnormality has occurred, whereby it is made possible to prevent erroneous lighting of the charging abnormality warning lamp.

8 Claims, 12 Drawing Sheets

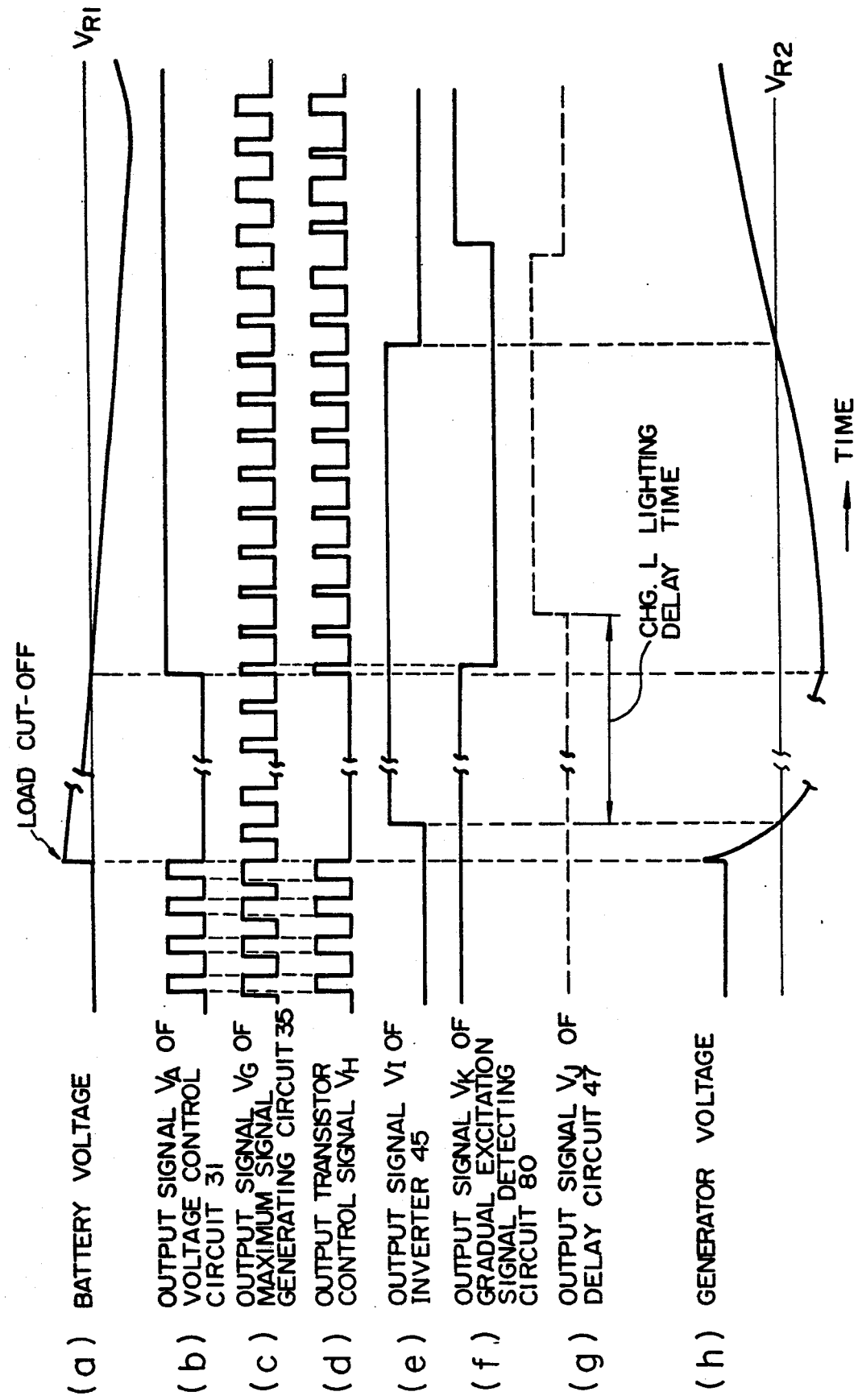

CHARGING CONTROL APPARATUS FOR VEHICLE GENERATORS

BACKGROUND OF THE INVENTION

1. Field of the Invention

The present invention relates to a charging control apparatus for a vehicle in which the rate of increase in a current flowing through a field winding is controlled to increase a generator voltage gradually, and more particularly, to a charging control apparatus which prevents malfunction of a charging abnormality warning device.

2. Description of the Related Art

A charging control apparatus is disclosed in JP-A-59-83600 (corresponding to U.S. Pat. No. 4,459,489). In the disclosed charging control apparatus, when a large electric load is applied, it is detected that an output voltage of a generator drops down to a predetermined value (0.5 V) and below, and, in response to the result of detection, the conduction rate is increased gradually from the conduction rate of switching means before an electric load is applied, which switching means is connected in series with a field winding.

By gradually increasing the current flowing through the field winding, the load on the generator is gradually applied to an engine to which the generator is coupled, so that the engine can be prevented from vibration or stalling.

Further, in the charging abnormality detection display described in JP-A-49-38167, when electric generation is controlled so that a battery voltage assumes a first predetermined value $V_{R1}$, charging abnormality is detected and a charging abnormality warning lamp is turned on when the generator output voltage drops to assume a second predetermined value $V_{R2}$ and below which has been set to be smaller than the first predetermined value $V_{R1}$. However, such a state may be caused by intermittent application of a load, etc., even if the apparatus is normally operative. Therefore, the charging abnormality warning lamp is prevented from being turned on, even if the generator output voltage drops to assume the second predetermined value $V_{R2}$ and below, so far as the battery voltage has the first predetermined value $V_{R1}$ and above. Further, even when the battery voltage drops to assume the first predetermined value $VR_1$ and below and the generator starts electric generation in a state where the output voltage of the generator has dropped to assume the second predetermined value $V_{R2}$ and below at the time of intermittent application of a load, it takes time for the generator output voltage to reach the second predetermined value $V_{R2}$. Therefore, taking a build-up time of the generator into consideration, mislighting or erroneous lighting of the charging abnormality warning lamp is prevented by having a charging abnormality detection signal delayed for a predetermined time (delay time).

In the charging control apparatus described above, however, it happens sometimes that the charging abnormality warning lamp is turned on erroneously notwithstanding that a delay time has been set in the charging abnormality detection device.

More precisely, when a large electric load is cut off in a state where the generator is in operation under the application of the large electric load, the battery voltage rises for a moment due to charging of the battery by the generator. Thereafter, since it is necessary for the battery to supply a current only to a small load connected to this battery, the battery voltage falls very slowly as shown in FIG. 3 (a). At this time, however, the battery voltage has a value higher than the first predetermined value $V_{R1}$. Accordingly, the voltage of a stator winding which is the generator voltage, drops to assume the second predetermined value $V_{R2}$ and below as shown in FIG. 3 (g). Thereafter, just when the battery voltage drops to assume the first predetermined value $V_{R1}$ and below, the conduction rate of the switching means begins to increase gradually, and the current flowing through the field winding is increased gradually. Here, since the switching means has continued to stay in an OFF state, the conduction rate of the switching means increases gradually from 0%. Thus, as shown by a broken line in FIG. 3 (g), it takes a very long time for the voltage of the stator winding to reach the second predetermined value $V_{R2}$ and above.

Thus, the generator voltage cannot be recovered to the second predetermined value $V_{R2}$ within a predetermined delay time, and hence the charging abnormality warning lamp is turned on erroneously notwithstanding that the generator is operating normally.

SUMMARY OF THE INVENTION

It is an object of the present invention to prevent erroneous operation of charging abnormality warning means.

Further, it is another object of the present invention to prevent erroneous operation of charging abnormality warning means with a simple construction and without increasing the delay time.

BRIEF DESCRIPTION OF THE DRAWINGS

FIG. 14 is a waveform diagram showing waveforms of signals at respective points in the electric circuit of the sixth embodiment.

DESCRIPTION OF THE PREFERRED EMBODIMENTS

Figure 1:
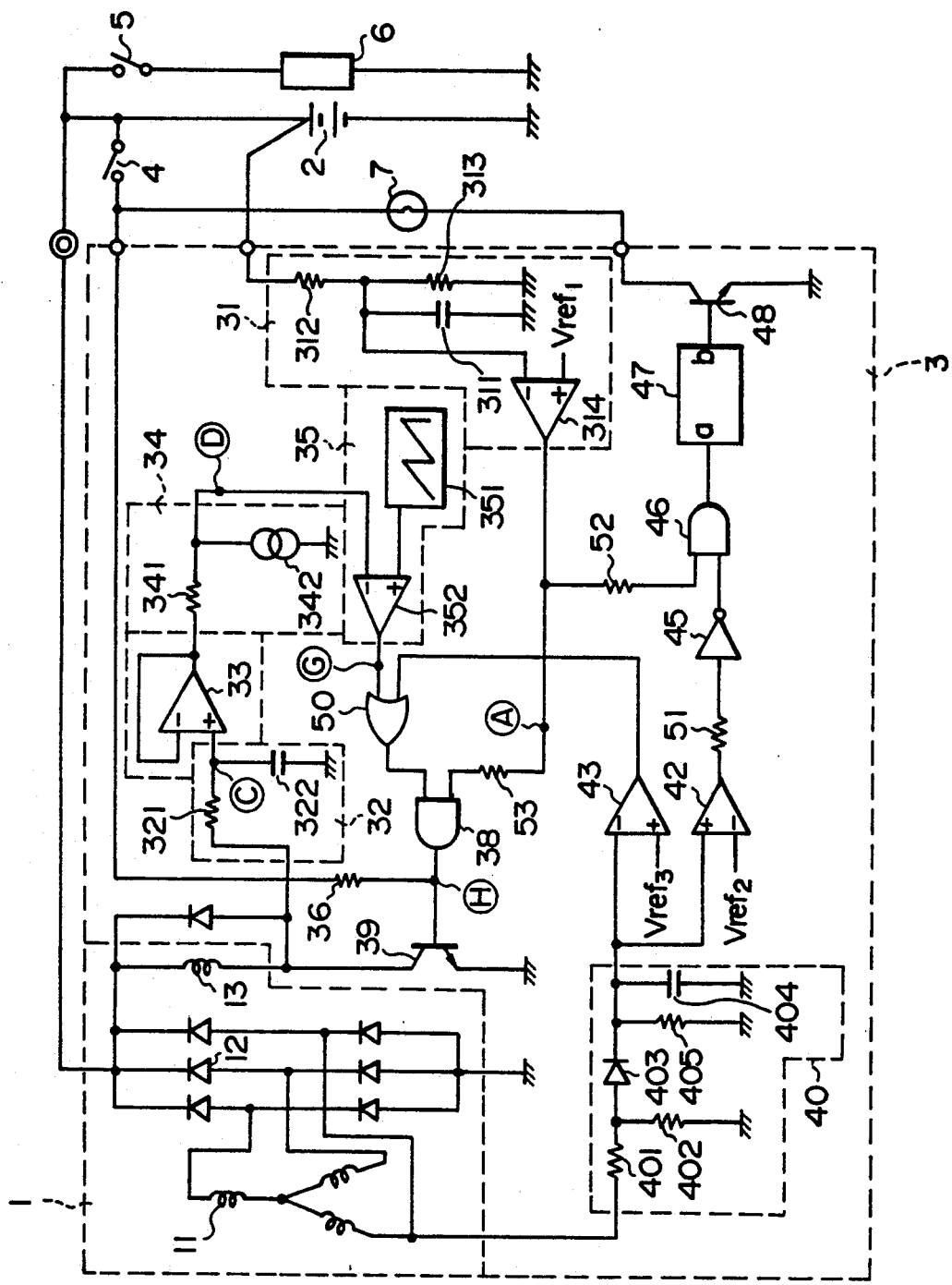
FIG. 1 is an electric circuit diagram showing a first embodiment of an apparatus of the present invention.

The present invention will be described hereafter with reference to the first embodiment shown in the drawings.

In FIG. 1, numeral 1 designates an AC generator of the vehicle. This generator 1 includes a three-phase stator winding 11 in Y connection, a field winding 13 rotationally driven by an engine not shown, and a rectifier 12 for full-wave rectifying the AC output generated by the stator winding 11. The generator 1 is driven by the engine through belt and pulley, as is well known.

Numeral 2 designates a battery, one end of which is connected to the full-wave rectifier 12. Numeral 4 designates a key switch, and numeral 5 a change-over switch for connecting an electric load 6 to the battery 2. Numeral 7 designates a warning lamp.

Numeral 3 designates a control circuit for controlling the field current flowing through the field winding 13 of the generator 1. This control circuit 3 is assembled on a housing of the AC generator 1 of the vehicle as is well known from U.S. Pat. Nos. 3,538,361 and 4,419,597.

Now, the control circuit 3 will be explained in detail.

A voltage control circuit 31 includes a comparator 314, a first resistor 312 connected to the plus (+) terminal of the battery 2, and a parallel circuit of a second resistor 313 and a capacitor 311.

The minus (−) input of the comparator 314, on the other hand, is connected between the first and second resistors 312 and 313, while the plus (+) input thereof is supplied with a reference voltage $V_{ref1}$ corresponding to a first predetermined value $V_{R1}$. This voltage control circuit 31 is set to produce a low-level output when the battery voltage is higher than $V_{R1}$ and a high-level output when the battery voltage is lower than $V_{R1}$.

Numeral 32 designates a mean conduction rate detection circuit inserted between the field winding 13 and an output transistor 39. This mean conduction rate detection circuit 32 includes a third resistor 321 and a capacitor 322 with an end thereof grounded. The charge of this capacitor 322 of the mean conduction rate detection circuit 32 is discharged through the third resistor 321, as the voltage level of the connection point between an end of the field winding 13 and the output transistor 39 becomes low when the output transistor 39 is conducting.

When the output transistor 39 is turned off, by contrast, the voltage between the field winding 13 and the output transistor 39 becomes high in level, so that the capacitor 322 is charged through the third resistor 321.

The third resistor 321 is set to have approximately one MΩ, the capacitor 322 is set to have approximately 0.02 μF, and the time constant due to the third resistor 321 and the capacitor 322 is set to have 200 msec. Also, the charging voltage of the capacitor 322, which corresponds to the voltage of a triangular wave generation circuit 351 described later, is adapted to have 4 V same as the peak value of the triangular wave voltage when fully charged, and 0 V same as the bottom value of the triangular wave voltage when fully discharged.

As a result, the charging voltage of the capacitor 322 is detected as a mean conduction rate of the output transistor 39 by charging and discharging of the capacitor 322 due to the turning on and off of the output transistor 39 during the period of about 200 msec. Specifically, the charging voltage of the capacitor 322 undergoes a change in the range from 0 V to 4 V which voltages correspond to the mean conduction rates of 100% to 0%.

Numeral 33 designates an impedance converter circuit including a voltage follower for detecting the voltage across the capacitor 322 accurately and producing the same as an output.

Numeral 34 designates a voltage reducing circuit for adding a predetermined value to the detection value of the mean conduction rate detection circuit 32. This voltage reducing circuit 34 includes a fourth resistor 341 and a constant current circuit 342. With the resistor 341 set to about 4 KΩ and the constant current to 100 μA, the amount of a voltage reduction in this circuit 42 is approximately 0.4 V equivalent to a conduction rate of 10%.

Numeral 35 designates a maximum signal generating circuit including a comparator 352 and a triangular wave generating circuit 351. The minus (−) input of this comparator 352 is connected to the output of the voltage reducing circuit 34, and the plus (+) input thereof to the triangular wave generating circuit 351.

The triangular wave generating circuit 351 generates a triangular wave having a peak value of 4 V, a bottom value of 0 V and a period T of about 20 msec.

When the mean conduction rate of the output transistor 39 is 50% in the aforementioned configuration, the charging voltage of the capacitor 322 of the mean conduction rate detection circuit 32 is 2 V. The output voltage of the voltage reducing circuit 34 is 1.6 V which is lower than 2 V by 0.4 V. Further, the maximum signal generating circuit 35, by comparing the output voltage of 1.6 V with a triangular wave at the comparator 352, produces an output signal having a duty factor of 60% and the same period of 20 msec as the triangular wave. Specifically, as compared with the duty factor D of the output transistor 39, the output signal of the maximum signal generating circuit 35 is set to have a duty factor of D+α (10%). Further, an excitation control means is constituted by the mean conduction rate detection circuit 32, the impedance converter circuit 33, the voltage reducing circuit 34 and the maximum signal generating circuit 35.

Numeral 38 designates an AND circuit supplied with an output of the comparator 314 of the voltage control circuit 31 and an output of the comparator 352 of the maximum signal generating circuit 35.

Numeral 39 designates an output transistor for turning on and off the current flowing through the field winding 13 in accordance with the output of the AND circuit 38. The output transistor 39 can be turned ON when the voltage of the battery 2 is applied thereto through the key switch 4. Thus, a resistor 36 limits the current flowing from the battery 2 to the base of the output transistor 39.

A generator output voltage detection circuit 40 is connected to one phase of the stator winding 11, and this detection circuit 40 comprises a resistor 401, a resistor 402, a discharge preventive diode 403, a hold capacitor 404 and a capacitor discharging resistor 405.

42 and 43 designate comparators, and reference voltages $V_{ref2}$ and $V_{ref3}$ corresponding to second and third predetermined value $V_{R2}$ and $V_{R3}$ are inputted to the minus (−) input terminal of the comparator 42 and the plus (+) input terminal of the comparator 43, respectively, and an output signal from the generator output voltage detection circuit 40 is inputted to the plus (+) input terminal of the comparator 42 and the minus (−) input terminal of the comparator 43. Here, the second predetermined value $V_{R2}$ and the third predetermined value $V_{R3}$ are set to be smaller than the first predetermined value $V_{R1}$ which is applied to the plus (+) input terminal of the comparator 314, and the third predetermined value $V_{R3}$ is set to be larger than the second predetermined value $V_{R2}$.

Further, the combination of the AND circuit 38, the comparator 43 and the OR circuit 50 constitutes a change-over circuit.

45 designates an inverter and 46 designates an AND circuit. The AND circuit 46 receives a voltage obtained by inverting the output voltage of the comparator 42 by the inverter 45 through a resistor 51 and an output voltage of the comparator 314 through a resistor 52, and outputs a high level signal when the voltage of the stator winding 11 which is the generator output voltage drops to a value lower than the second predetermined value $V_{R2}$ and the battery voltage drops to a value lower than the first predetermined value $V_{R1}$.

Figure 2:
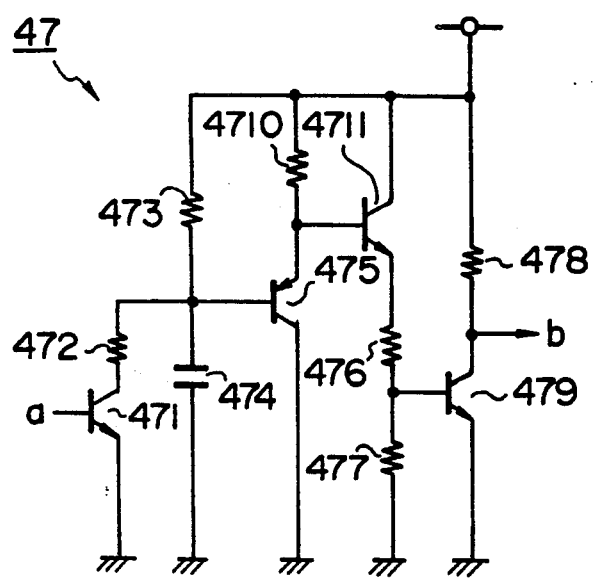
FIG. 2 is an electric circuit diagram showing a delay circuit of the first embodiment.

A delay circuit 47 is connected between the AND circuit 46 and a base of a lamp driving transistor 48 which drives a warning lamp 7. FIG. 2 shows the construction. This circuit 47 is composed of a resistor 472, a resistor 473, a resistor 476, a resistor 477, a resistor 478, a resistor 4710, a transistor 471, a transistor 475, a transistor 479, a transistor 4711, and capacitor 474, and a delay time of approximately 100 msec is set by this construction.

The operation of the circuit shown in the aforementioned configuration will now be explained.

Reference is made to the operation at the time of starting the engine in conjunction with the illustration of FIG. 1.

First, when the key switch 4 is turned on, the generator 1 has not yet generated power and the voltage $V_c$ at the point (C) of the mean conduction rate detection circuit 32 shown in FIG. 1 is charged to 4 V from the battery 2 and through the field winding 13 and a resistor 321, so that the output voltage of the voltage reducing circuit 34 is 3.6 V which is lower than $V_c$ by 0.4 V. As a result, the output signal $V_G$ of the maximum signal generating circuit 35 is a control signal having a duty factor of 10% and a period of about 20 msec. Further, since no voltage has been generated in the stator winding 11 which generates a generator output voltage, the comparator 43 outputs a high level signal, and an OR circuit 50 outputs a high level signal regardless of the output signal $V_G$ of the maximum signal generating circuit 35. On the other hand, the comparator 314 outputs a high level signal until the time of starting-up of the engine, since the battery voltage, which is inputted thereto, assumes the first predetermined value $V_{R1}$ and below.

Accordingly, the output transistor 39 is turned ON, and a current is applied to the field winding 13. Further, a capacitor 322 of the mean conduction rate detection circuit 32 is discharged through the resistor 321 when the output transistor 39 is turned ON. Thus, the output signal of the maximum signal generating circuit 35 becomes a signal having a 100% ON-duty factor, i.e., a high level signal as described previously. Further, since no voltage has been generated in the stator winding 11 as described above, the input to the plus (+) input terminal of the comparator 42 has the reference voltage $V_{ref2}$ corresponding to the second predetermined value $V_{R2}$ and below, and the comparator 42 outputs a low level signal. At this time, since the comparator 314 outputs a high level signal as described previously, the charging abnormality warning lamp 7 is in the ON state.

The operation of the generator 1 starting to perform electric generation after the engine (E/G) has started will now be explained with reference to FIG. 3. Before E/G starts, the output transistor 39 is in the ON state. When the E/G is started, the E/G speed increases, the output of the generator 1 is increased accordingly, and the voltage of the stator winding 11 reaches the second predetermined value $V_{R2}$ and above. Accordingly, the comparator 42 outputs a high level signal, and a low level signal is inputted to the AND circuit 46 through the inverter 45. Thus, the charging abnormality warning lamp 7 is turned off.

Then, when the battery voltage reaches the first predetermined value $V_{R1}$, the output of the voltage control circuit 31 is changed over from a high level to a low level, and the output transistor 39 is cut off.

When the battery voltage drops to assume the first predetermined value $V_{R1}$ and below, the output of the voltage control circuit 31 is changed over from a low level to a high level. Thus, the output transistor 39 is brought into a conducting state again.

While such an operation is repeated, the battery voltage is controlled to assume continuously the first predetermined value $V_{R1}$.

Next, the operation when a large electric load is cut off in a state where the generator is in operation will be described.

At that time, a current which has been supplied to a large load so far flows into the battery 2. Thus, the battery 2 is charged and the battery voltage rises. Thereafter, the battery voltage needs only to supply electric power to a small load, and drops very slowly as shown in FIG. 3 (a). During that period, the battery voltage drops to assume the third predetermined value $V_{R3}$ and below, and drops further to assume the second predetermined value $V_{R2}$ and below as shown in FIG. 3 (g).

Since the output transistor 39 has been in an OFF state for a long time until the battery voltage drops to assume the first predetermined value $V_{R1}$ and below as described above, the capacitor 322 of the mean conduction rate detection circuit 32 has been charged completely. As a result, a voltage corresponding to the conduction rate of 0(%) is produced, and the signal of the maximum signal generating circuit 35 outputs a signal having a 10% ON-duty factor to the OR circuit 50.

On the other hand, the output voltage of the generator has the second predetermined value $V_{R2}$ and below, and $V_{R3} > V_{R2}$. Therefore, a high level signal of the comparator 43 is inputted to the OR circuit 50. Thus, the OR circuit 50 supplies a high level signal to the AND circuit 38.

Further, since the battery voltage drops to assume the first predetermined value $V_{R1}$ and below, the output of the comparator 314 of the voltage control circuit 31 also becomes high level. Accordingly, the AND circuit 38 outputs a high level signal, thus keeping the output transistor 39 in an ON state.

Figure 3:
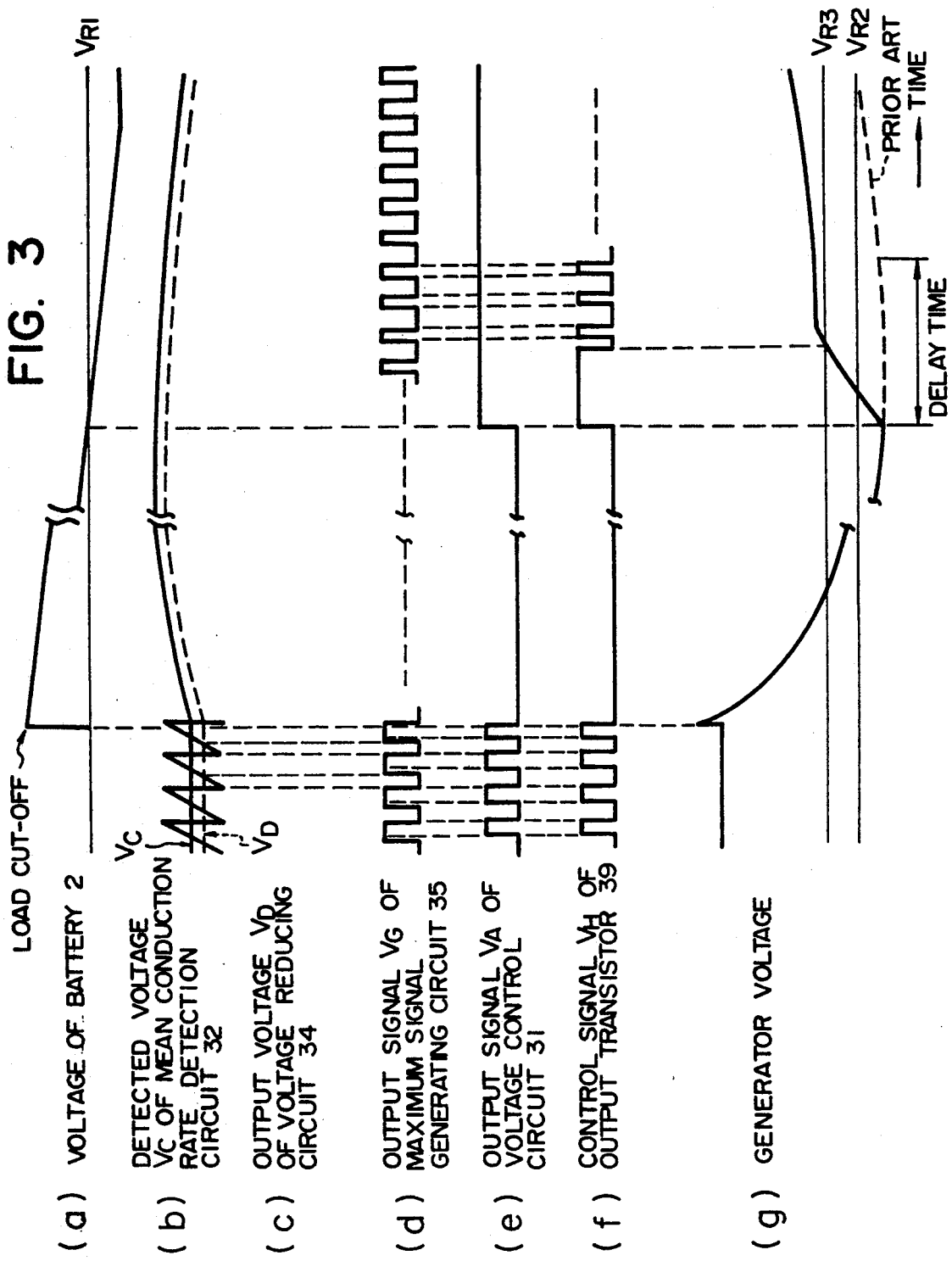
FIG. 3 is a waveform diagram showing waveforms of voltages and/or signals at respective points in the electric circuit at the time of interruption of an electric load in the first embodiment.

Thus, the current flowing through the field winding 13 increases rapidly, and the voltage of the stator winding 11 rises up to assume the second predetermined value $V_{R2}$ within the delay time of the delay circuit 47, as shown in FIG. 3 (g).

When the voltage of the stator winding 11 reaches the third predetermined value $V_{R3}$ and above thereafter, the comparator 43 outputs a low level signal. Since the battery voltage still remains at the first predetermined value $V_{R1}$ and below, the output of the comparator 314 of the voltage control circuit 31 is high level. Thus, the output of the AND circuit 38 is determined in accordance with the output signal of the maximum signal generating circuit 35.

As a result, the output transistor 39 is controlled by the output signal of the maximum signal generating circuit 35. Further, the output voltage $V_C$ of the mean conduction rate detection circuit 32 drops gradually with a time constant of 200 msec determined by a resistor 321 and a capacitor 322 and by the charge and discharge of the duty of the output transistor 39.

In keeping with the above, the output voltage $V_D$ of the voltage reducing circuit 34 also drops gradually from a voltage lower than the output voltage $V_C$ by 0.4 V.

Thus, the output signal of the maximum signal generating circuit 35 rises gradually from the 30% ON-duty factor, for instance, with the fall of the output voltage $V_D$ of the voltage reducing circuit 34, and the ON-duty factor of the output transistor 39 increases gradually. Accordingly, the voltage of the generator reaches the third predetermined value $V_{R3}$ and above and increases gradually thereafter, as shown in FIG. 3 (g).

Since the conduction rate increases gradually from 0% as shown by a broken line in FIG. 3 (g) in a conventional apparatus, it takes a very long time for the generator voltage to rise up to $V_{R2}$. Therefore, the voltage of the stator winding 11 does not rise up to the second predetermined value $V_{R2}$ within the delay time, and the charging abnormality warning lamp 7 is turned on notwithstanding that the generator is normally operating. On the contrary, in the first embodiment of the present invention, since the voltage of the stator winding 11 is increased to the second predetermined value $V_{R2}$ and above within the delay time, the charging abnormality warning lamp 7 is not turned ON. Therefore, it is possible to prevent erroneous lighting without extending the delay time. The above-described structure prevents an erroneous operation of the lamp 7, so that it constitutes an erroneous operation preventing means. The above-described structure prevent erroneous operation of the lamp 7, and hence is an erroneous operation preventing means.

Next, a second embodiment will be described.

Figure 4:
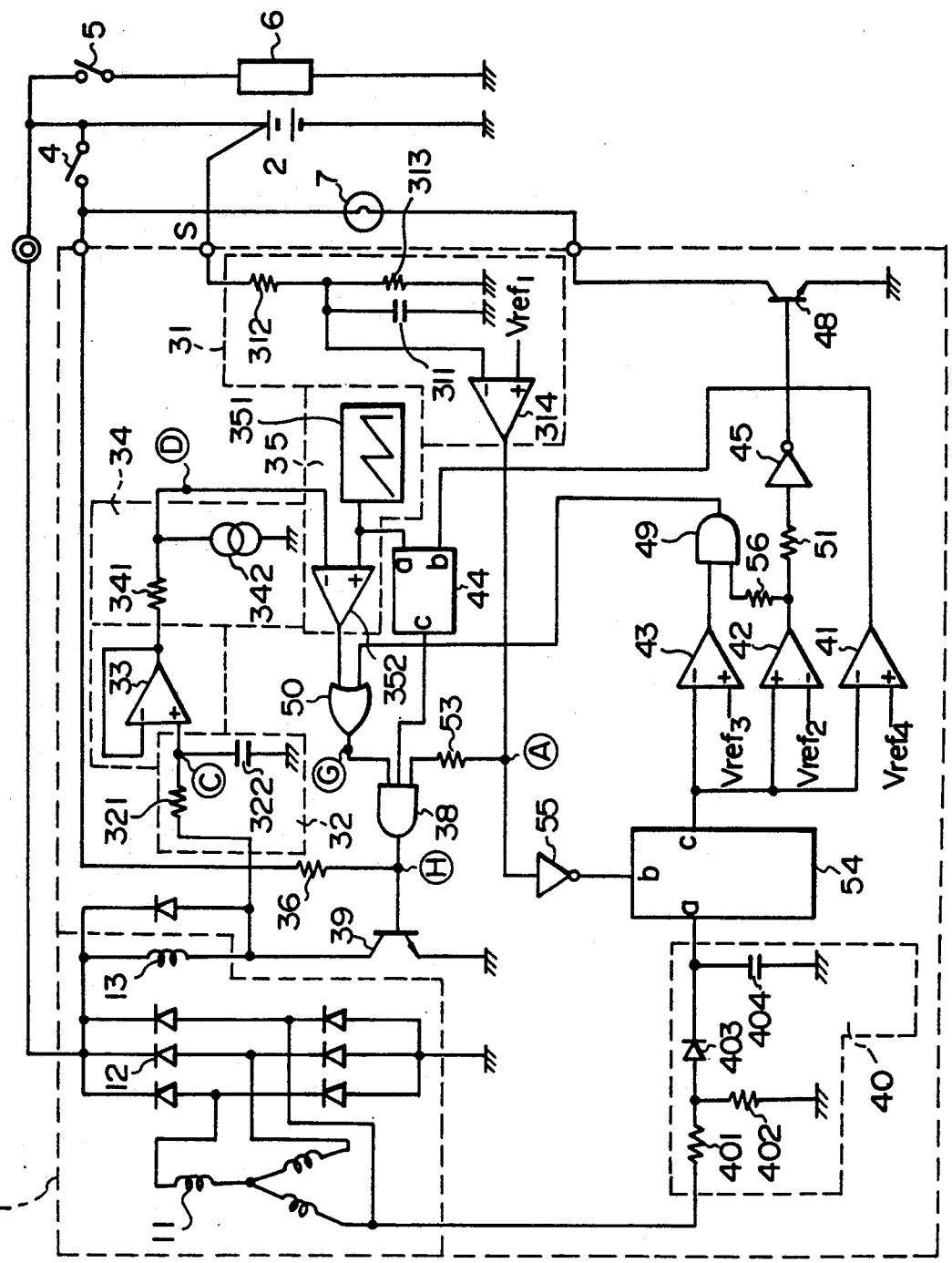
FIG. 4 is an electric circuit diagram showing a second embodiment of an apparatus of the present invention.

In FIG. 4, the same symbols are in accord with those that are shown in the first embodiment. Also, in this second embodiment, the excitation control means is constituted by the mean conduction rate detection circuit 32, the impedance converter circuit 33, the voltage reducing circuit 34 and the maximum signal generating circuit 35. The discharge of a capacitor in the generator output voltage detection circuit 40 has been performed with the capacitor discharging resistor 405 in the first embodiment, but a capacitor discharging circuit 54, which is described later, fullfills the duties in the second embodiment.

41, 42 and 43 designate comparators, and reference voltages $V_{ref4}$, $V_{ref3}$ and $V_{ref2}$ corresponding to the fourth, the third and the second predetermined values $V_{R4}$, $V_{R3}$ and $V_{R2}$, respectively, are inputted to the plus (+) input terminals of the comparators 41 and 43 and the minus (−) input terminal of the comparator 42. (Here, those reference voltages are selected so as to satisfy the relation: $V_{ref3} > V_{ref2} > V_{ref4}$.) Further, an output signal from the generator output voltage detection circuit 40 is inputted to the minus (−) input terminals of the comparators 41 and 43 and the plus (+) input terminal of the comparator 42.

Figure 5:
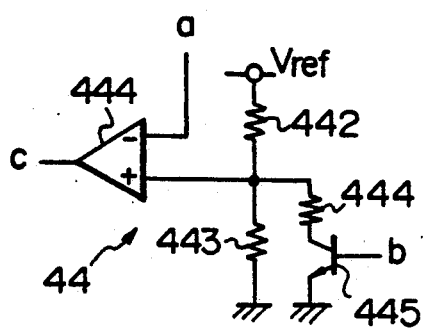
FIG. 5 is an electric circuit diagram showing an initial exciting circuit of the second embodiment.

FIG. 5 shows a construction of an initial exciting circuit 44. This circuit is composed of a comparator 441, a resistor 442, a resistor 443, a resistor 444 and a transistor 445. A power supply input terminal of a collector resistor 444 of the transistor 445 is connected to the plus (+) input terminal of the comparator 441, an output of the triangular wave generating circuit 351 is connected to the minus (−) input terminal a of the comparator 441, and the output c of the initial exciting circuit 44 is connected to the input terminal of the AND circuit 38. The output of the comparator 41 is inputted to the base input b of the transistor 445.

Thus, in the construction described above, a signal having a 25% ON-duty factor, for instance, is outputted from the output c of the comparator 441 by comparing a potential determined by a constant voltage source $V_{ref}$, the resistor 442, the resistor 443 and the resistor 444 with the triangular wave under a state that the signal of the comparator 41 is a high level signal and the transistor 445 is in the ON state. Further, when the comparator 41 outputs a low level signal, the transistor 445 is turned OFF. Since the potential determined by the constant voltage source $V_{ref}$, the resistor 442 and the resistor 443 have been set to be larger than the peak potential of the triangular wave, a high level signal is outputted from the output terminal of the comparator 441.

An inverter 45 inverts the signal of the comparator 42, and outputs it to a lamp driving transistor 48.

An AND circuit 49 receives the output of the comparator 42 through a resistor 56 and the output of the comparator 43, and outputs to an OR circuit 50.

Here, the combination of the AND circuit 38, the comparator 43, the AND circuit 49 and the OR circuit 50 constitutes a change-over circuit.

Figure 6:
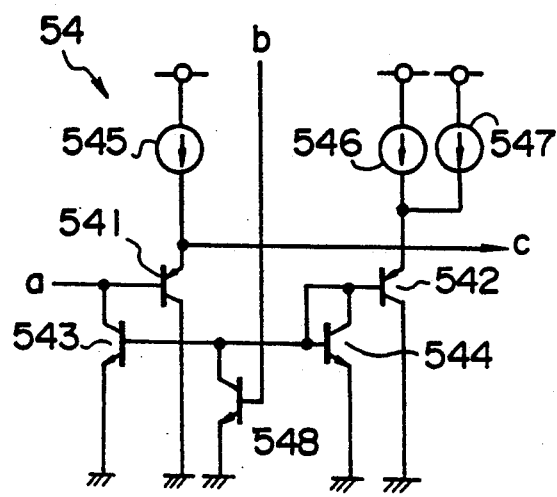
FIG. 6 is an electric circuit diagram showing a capacitor discharge circuit of the second embodiment.

FIG. 6 shows a construction of a capacitor discharging circuit 54.

A constant current source 545, the minus (−) input terminals of the comparators 41 and 43, and the plus (+) input terminal of the comparator 42 are connected to an emitter of a transistor 541, and a hold capacitor 404 and a collector of a transistor 543 are connected to the base thereof.

A constant current source 546 and a constant current source 547 connected in parallel with each other are connected to an emitter of a transistor 542, and a collector and a base of a transistor 544 are connected to the base thereof.

An output of an inverter 55 is connected to a base input b of a transistor 548, and the base of the transistor 543 and the base of the transistor 544 are connected to the collector thereof.

This transistor 548 is turned ON when the battery voltage has a value higher than the first predetermined value $V_{R1}$, and the transistor 543 is turned OFF at that time. Therefore, the hold capacitor 404 is charged by the output of the stator winding 11 and the base current of the transistor 541. On the other hand, when the battery voltage drops to the first predetermined voltage and below and the transistor 548 is turned OFF, the transistors 543 and 544 are turned ON, and the hold capacitor 404 is discharged gradually through the transistor 543.

Next, the operation in the construction described above will be described.

First, when the key switch 4 is turned on, the same operation as that of the first embodiment is performed, and a control signal having a 10% ON-duty factor and a period of about 20 msec of the output signal $V_G$ of the maximum signal generating circuit 35 is outputted. On the other hand, at the time of starting the engine, the comparator 314 outputs a high level signal, since the battery voltage, which is inputted, has the first predetermined value $V_{R1}$ and below. Since the voltage of the stator winding 11, which is the generator output voltage, has not been generated yet and the output of the comparator 314 is also a high level signal, the capacitor 404 is under a discharging state, and the output voltage of the capacitor discharging circuit 54 is lower than the second predetermined value $V_{R2}$. Thus, the comparator 42 outputs a low level signal, and the output of the AND circuit 49 also becomes a low level signal. Accordingly, the output signal of the maximum signal generating circuit 3 is outputted as it is as the output signal of the OR circuit 50.

Further, the output signal of the comparator 41 becomes a high level signal, and the transistor 445 of the initial exciting circuit 44 is turned ON. With this, the output of the comparator 441 becomes a signal having a 25% ON-duty factor for instance.

However, the output transistor 39 is controlled by the signal $V_G$ (a signal having a 10% ON-duty factor) of the maximum signal generating circuit 35 through the AND circuit 38. Then, due to the fact that the output transistor 39 is controlled by the signal having a 10% ON-duty factor, the capacitor voltage of the mean conduction rate detection circuit 32 drops gradually while repeating charge and discharge through ON and OFF of the output transistor 39. In keeping with this, the output voltage of the voltage reducing circuit 34 also drops gradually. Therefore, the output signal $V_G$ of the maximum signal generating circuit 35 increases gradually. Thus, the conduction rate of the output transistor 39 increases, and the current flowing through the field winding 13 increases gradually.

Then, the conduction rate increases until the output transistor 39 is operated by the signal having an ON-duty factor which is the output of the comparator 441 of the initial exciting circuit 44. In other words, the ON-duty factor of the output transistor 39 before the generator is started is determined to be 25%.

Besides, the output signal of the maximum signal generating circuit 35 is a signal having an ON-duty factor of 25+10=35%.

Also, the comparator 42 outputs a low level signal, because the voltage of the stator winding 11, which is the generator voltage and which is inputted as described above, has the predetermined value $V_{R2}$ and below corresponding to the second reference voltage value $V_{ref2}$, and therefore the charging abnormality warning lamp 7 is turned on.

Next, the operation when the engine (E/G) is started and the generator 1 starts electric generation will be described.

Before the E/G is started, a control signal $V_H$ of the output transistor 39 is a signal having an ON-duty factor determined by the initial exciting circuit 44 as described above. When the E/G is started, the E/G speed is increased, the output voltage of the generator 1 is increased accordingly, and the voltage of the stator winding 11 reaches the fourth predetermined value $V_{R4}$ and above, the comparator 41 outputs a low level signal. Since this brings the transistor 445 of the initial exciting circuit 44 into an OFF state, and the comparator 441, i.e., the initial exciting circuit 44 outputs a high level signal, the output transistor 39 is controlled by a signal having an ON-duty factor determined by the maximum signal generating circuit 35.

Furthermore, when the output of the generator 1 is increased, and the voltage of the stator winding 11 reaches the second predetermined value $V_{R2}$ and above, the comparator 42 outputs a high level signal and turns off the charging abnormality warning lamp 7 through the inverter 45.

Then, when the battery voltage reaches the first predetermined value $V_{R1}$ and above, the transistor 39 is turned off, and when the battery voltage drops to assume the first predetermined value $V_{R1}$ and below, the transistor 39 is turned on, thus controlling the battery voltage to stay at the first predetermined value $V_{R1}$ by such an operation as described above.

Next, the operation when a large electric load is cut off under a condition that the generator is in operation will be described.

The battery voltage drops very slowly in the manner similar to the first embodiment. The voltage of the stator winding 11 drops to the third predetermined value $V_{R3}$ and below, and drops further to the second predetermined value $V_{R2}$ and below during this period. While the battery voltage is higher than the first predetermined value $V_{R1}$, however, the output of the comparator 314 is a low level signal. Thus, a high level signal voltage is applied to the base of the transistor 548 of the capacitor discharge circuit 54, and the transistor 548 is turned ON and the transistor 543 is turned OFF. Therefore, the capacitor 404 is not discharged. Then, when the battery voltage drops to the first predetermined value $V_{R1}$ and below, the output of the comparator 314 becomes high level. Thus, the transistor 548 of the capacitor discharge circuit 54 is turned OFF, the transistor 543 is turned ON, and the capacitor 404 starts discharging. At this time, the output of the comparator 41 is low level, the output $V_A$ of the initial exciting circuit 44 is high level, and the output $V_A$ of the comparator 314 is high level. Thus, the AND circuit 38 is operated based on the output of the OR circuit 50.

Since the output transistor 39 has been in an OFF state for a long period of time until the battery voltage drops to $V_{R1}$ and below, the mean conduction rate detection circuit 32 outputs a voltage corresponding to the conduction rate of 0%, and the maximum signal generating circuit 35 outputs a signal having a 10% ON-duty factor.

Further, since the voltage at the output c of the capacitor discharge circuit 54 is higher than $V_{ref3}$, the output of the comparator 43 is low level and the output of the AND circuit 49 is also low level. Accordingly, the output of the OR circuit 50 is controlled by the output of the maximum signal generating circuit 35, and the output transistor 39 is turned ON and OFF by that output signal. However, since the conduction rate at this point is as small as 10%, the generator voltage is slow to rise, and discharging is effected until the output voltage $V_C$ of the capacitor discharge circuit 54 drops to $V_{ref3}$ and below. Then, the output of the comparator 43 becomes high level, and the output of the AND circuit 49 also becomes high level, because the output voltage $V_C$ of the capacitor discharge circuit is higher than $V_{ref2}$ at this time. Thus, the output of the maximum signal generating circuit 35 is masked by the OR circuit 50, and the ON-duty factor of the output transistor 39 becomes 100%. Then, the current flowing through the field winding 13 is increased rapidly, and the generator voltage becomes higher than $V_{ref2}$ before the output voltage $V_C$ of the capacitor discharge circuit 54 drops down to $V_{ref2}$, and the charging abnormality warning lamp 7 will never be turned on.

When the generator voltage reaches the third reference voltage value $V_{ref3}$ and above thereafter, the comparator 43 outputs a low level signal. Thus, ON and OFF of the transistor 39 are controlled in response to the output signal of the maximum signal generating circuit 35, and the generator voltage rises gradually.

Figure 10:
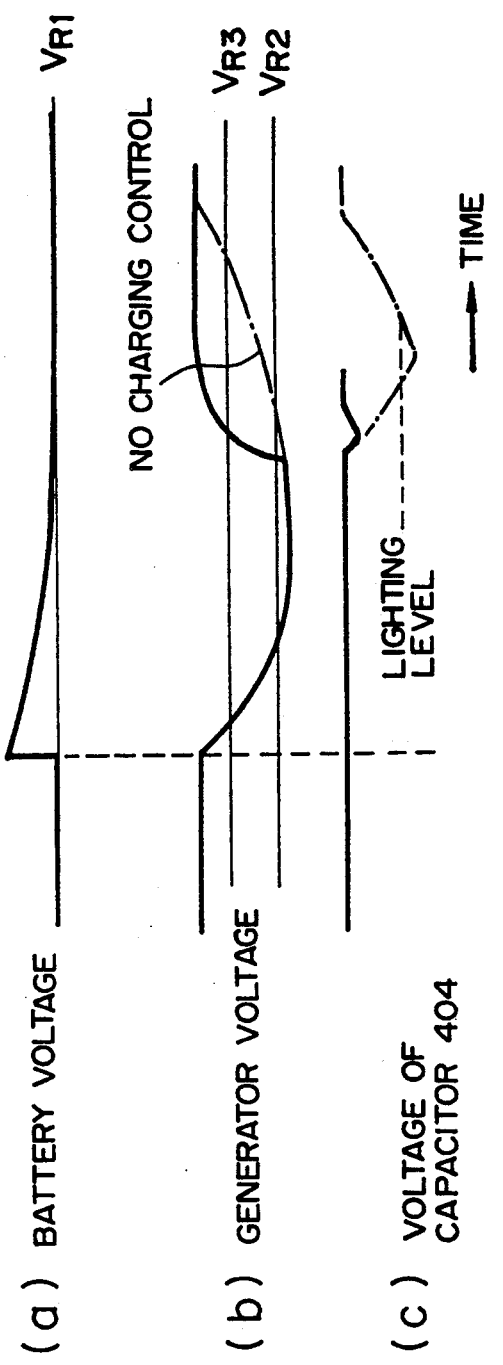
FIG. 10 is a waveform diagram showing voltages and/or signals at respective points in the electric circuit of the second embodiment.

In a conventional apparatus, the conduction rate of the current flowing through the field winding is increased gradually from 0%, thereby to increase the current flowing through the field winding. Therefore, as shown by a one-dot chain line in FIG. 10 (b), it takes a very long time for the generator voltage to reach the second predetermined value $V_{R2}$ and above, and the hold capacitor 404 continues to discharge and the voltage thereof drops to the second reference voltage value $V_{ref2}$ and below as shown by a broken line in FIG. 10 (c). Since the voltage of the hold capacitor 404 does not rise to the second reference voltage value $V_{ref2}$ and above thereafter until the generator voltage is recovered to the second predetermined value $V_{R2}$ and above, the charging abnormality warning lamp 7 is turned on erroneously.

On the contrary, in the second embodiment of the present invention, it is possible to prevent erroneous lighting without extending the delay time by providing a delay circuit.

At the time when the generator voltage decreases, there is a difference between the first embodiment and the second embodiment in that the discharging capacitor 404 is discharged completely in the first embodiment, while, the electric charge of the capacitor 404 is retained in the second embodiment.

Next, a third embodiment will be described.

Figure 8:
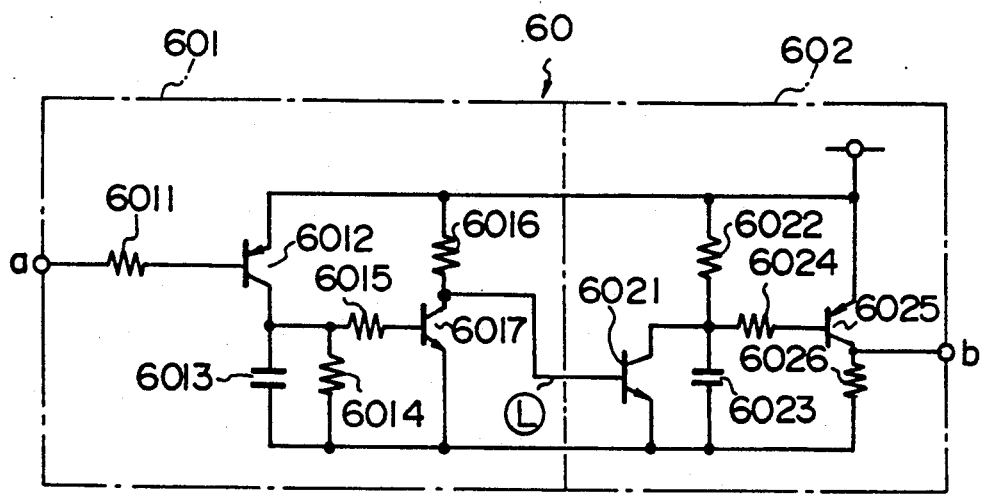
FIG. 8 is an electric circuit diagram showing a load cutoff detecting circuit of the third embodiment.
Figure 7:
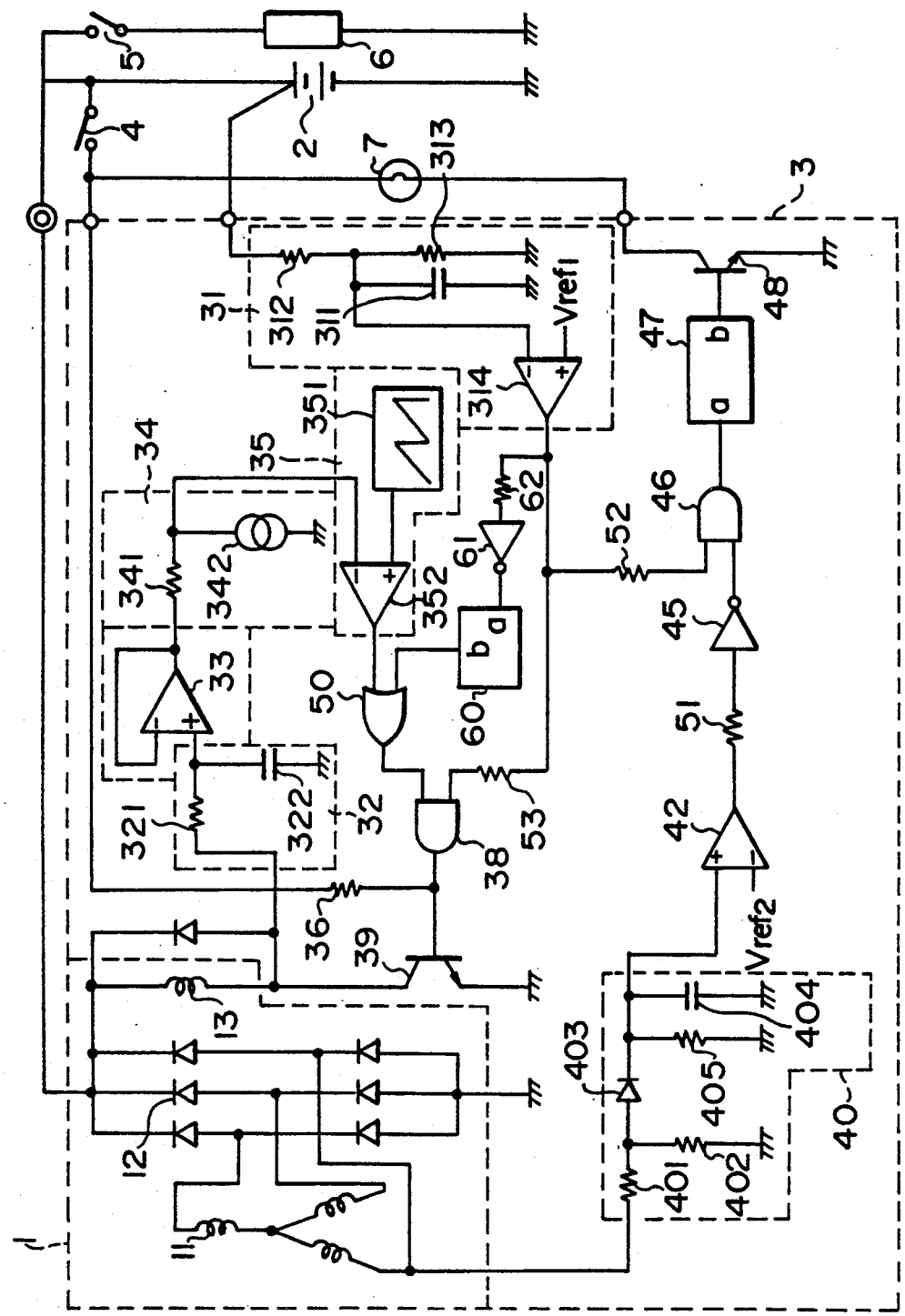
FIG. 7 is an electric circuit diagram showing a third embodiment of an apparatus of the present invention.

FIG. 7 shows the construction thereof. Also, in this third embodiment, the excitation control means is constituted by the mean conduction rate detection circuit 32, the impedance converter circuit 33, the voltage reducing circuit 34 and the maximum signal generating circuit 35. In FIG. 7, 60 designates a change-over circuit forming a component of a load cut off detecting circuit and the construction of the load cut-off detecting circuit is shown in FIG. 8. This load cut-off detecting circuit 60 is composed of a filter circuit 601 and a delay circuit 602.

The construction and the operation of the filter circuit 601 will be described hereunder.

One end of a resistor 6011 is connected to an input terminal a, and another end of the resistor 6011 is connected to a base of a transistor 6012. The emitter of the transistor 6012 is connected to a constant voltage source, and the collector thereof is connected to a capacitor 6013, respectively. A resistor 6014 is connected in parallel with the capacitor 6013. A resistor 6016 is connected between a collector of a transistor 6017 and the constant voltage source. A resistor 6015 is connected between the base of the transistor 6017 and a terminal of the resistor 6014 for connection to the collector of the transistor 6012. The emitter of the transistor 6017 is connected to ground.

With the construction described above, when the potential at the input terminal a is low level, the transistor 6012 is turned ON, the capacitor 6013 is charged and the transistor 6017 is turned ON at the same time, thus setting the potential at the point Ⓛ to low level. Next, when the potential at the input terminal a becomes high level, the transistor 6012 is turned OFF, and electric charges stored in the capacitor 6013 are discharged through resistors 6014 and 6015. In this case, the time for completing the discharge of the capacitor 6013 is determined based on its relationship with the resistor 6014 and is set at 50 ms for instance. By the discharge of the capacitor 6013, the transistor 6017 is turned OFF in approximately 50 ms, thus bringing the potential at the point Ⓛ to high level. In other words, when the potential at the input terminal a changes to low level from high level, the potential at the point Ⓛ changes to low level from high level instantly. On the other hand, when the potential at the input terminal a changes to high level from low level, the potential at the point Ⓛ changes to high level from low level after the lapse of approximately 50 ms. Accordingly, the potential at the point Ⓛ does not become high level unless the state of high level of the potential at the input terminal a is continued for 50 ms and longer.

Next, the construction and the operation of the delay circuit 602 will be described.

A base of a transistor 6021 is connected between the resistor 6016 and the collector of the transistor 6017 in the filter circuit 601, and the transistor 6021 is turned ON and OFF in accordance with the potential at the point Ⓛ. The collector of the transistor 6021 is connected to a constant voltage source through a resistor 6022, and the emitter thereof is connected to ground. A capacitor 6023 is connected between the collector and the emitter of the transistor 6021. The base of the transistor 6025 is connected to the collector of the transistor 6021 through a resistor 6024, the emitter thereof is connected to the constant voltage source and the collector thereof is connected to ground through a resistor 6026, respectively.

With the construction described above, when the potential at the point Ⓛ is high level, the transistor 6021 is turned on, the transistor 6025 is turned ON, the potential at the output terminal b becomes high level, and the capacitor 6023 is discharged. Then, when the potential at the point Ⓛ drops to low level, the transistor 6021 is turned OFF, and the capacitor 6023 is charged by the current flowing through resistors 6022 and 6024. The time for completing charging of the capacitor 6023 is determined by its relationship with the resistor 6022 at that time, and is set to 100 ms for instance. By the charging of the capacitor 6023, the transistor 6025 is turned OFF in approximately 100 ms, and the potential at the output terminal b becomes low level. In other words, when the potential at the point Ⓛ changes to high level from low level, the potential at the output terminal b changes to high level from low level instantly. On the other hand, when the potential at the point Ⓛ changes to low level from high level, the potential at the output terminal b changes to low level from high level after the lapse of approximately 100 ms. The input terminal a of this load cut-off detecting circuit 60 is connected to the output of the comparator 314 of the voltage control circuit 31 through an inverter 61. On the other hand, the output terminal b is connected to an input to the OR circuit 50.

The operation in the construction described above will be described.

First, the voltage control circuit 31 outputs a high level signal and a low level signal alternately as to maintain the battery voltage at the first predetermined value $V_{R1}$ under a state of a constant load. The load cut-off detecting circuit 60 inputs a signal obtained by inverting this control signal.

In general, this input signal is a pulse signal having a very short period, and a high level state will never be continued for 50 ms and longer. Accordingly, the potential at the point Ⓛ is maintained as it is, the potential at the output terminal b is also maintained as it is in a low level state, and the output transistor 39 is controlled by the control signal of the voltage control circuit 31.

Next, an operation of the apparatus of the present invention, when a large electric load has been cut off, is explained. As shown in the descriptions of the first and second embodiments, the battery voltage rises once and then drops gradually after the electric load has been cut off. For example, assume that the battery voltage drops to the first predetermined value $V_{R1}$ or lower after the lapse of a short time after cutting off the electric load and the voltage control circuit 31 generates a high level output signal.

During this period, since the output signal of the voltage control circuit 31 becomes low level after the cutting off of the load, a high level signal is inputted to the input terminal a of the load cut-off detecting circuit 60. As described previously, the potential at the output terminal b becomes high level almost at the same time as the potential at the point Ⓛ becomes high level after 50 ms. The voltage control circuit 31 outputs a high level signal. In 200 ms until the voltage control circuit 31 outputs a high level signal, the capacitor 6023 of the delay circuit 602 is discharged completely.

When the voltage control circuit 31 outputs a high level signal, the potential at the input terminal a becomes low level, and the potential at the point Ⓛ becomes low level almost at the same time as described previously. The potential at the point Ⓛ becomes low level, and the output terminal b becomes low level after 100 ms.

Thus, a signal from the maximum signal generating circuit 35 is masked within a predetermined time even if the battery voltage drops to $V_{R1}$ and below, and the OR circuit 50 also outputs a high level signal. Accordingly, the ON-duty factor of the output transistor becomes 100%, the current flowing through the field winding is increased rapidly, and the voltage of the stator winding 11 rises to the second predetermined value $V_{R2}$ and above within the delay time. When the voltage of the output terminal b of the load cut-off detecting circuit 60 becomes a low level signal thereafter, the OR circuit outputs a control signal having an ON-duty factor determined by the maximum signal generating circuit 35 and controls ON and OFF of the output transistor 39 through the AND circuit 38, and the current flowing through the field winding is increased gradually.

As will be understood from the foregoing description, the combination of the AND circuit 38, the OR circuit 50 and the load cut-off detecting circuit 60 constitutes a change-over circuit.

Furthermore, after the battery voltage reaches the first predetermined voltage $V_{R1}$, the voltage control circuit 31 and the load cut-off detecting circuit 60 operate in the same manner as the above-mentioned state of a constant electric load.

Since the same effects as are obtained in the first or the second embodiment are also obtainable in a third embodiment, erroneous lighting of the charging abnormality warning lamp can be prevented without extending the delay time by using a delay circuit.

A fourth embodiment will be described with reference to FIG. 9.

Symbols in the figure correspond to those shown in the first embodiment. Also, in this fourth embodiment, the excitation control means is constituted by the mean conduction rate detection circuit 32, the impedance converter circuit 33, the voltage reducing circuit 34 and the maximum signal generating circuit 35. In a state of a constant load, the output transistor 39 is controlled in response to a high level signal of the voltage control circuit 31, i.e., a signal having a 100% ON-duty factor in the third embodiment. On the contrary, in the fourth embodiment, the output transistor 39 is controlled with a signal having a high ON-duty factor by connecting such a constant current source 343, which sets the voltage drop quantity of the voltage reducing circuit 34 to 2 V which corresponds to the conduction rate of 50%, in parallel with a constant current source 342.

Figure 9:
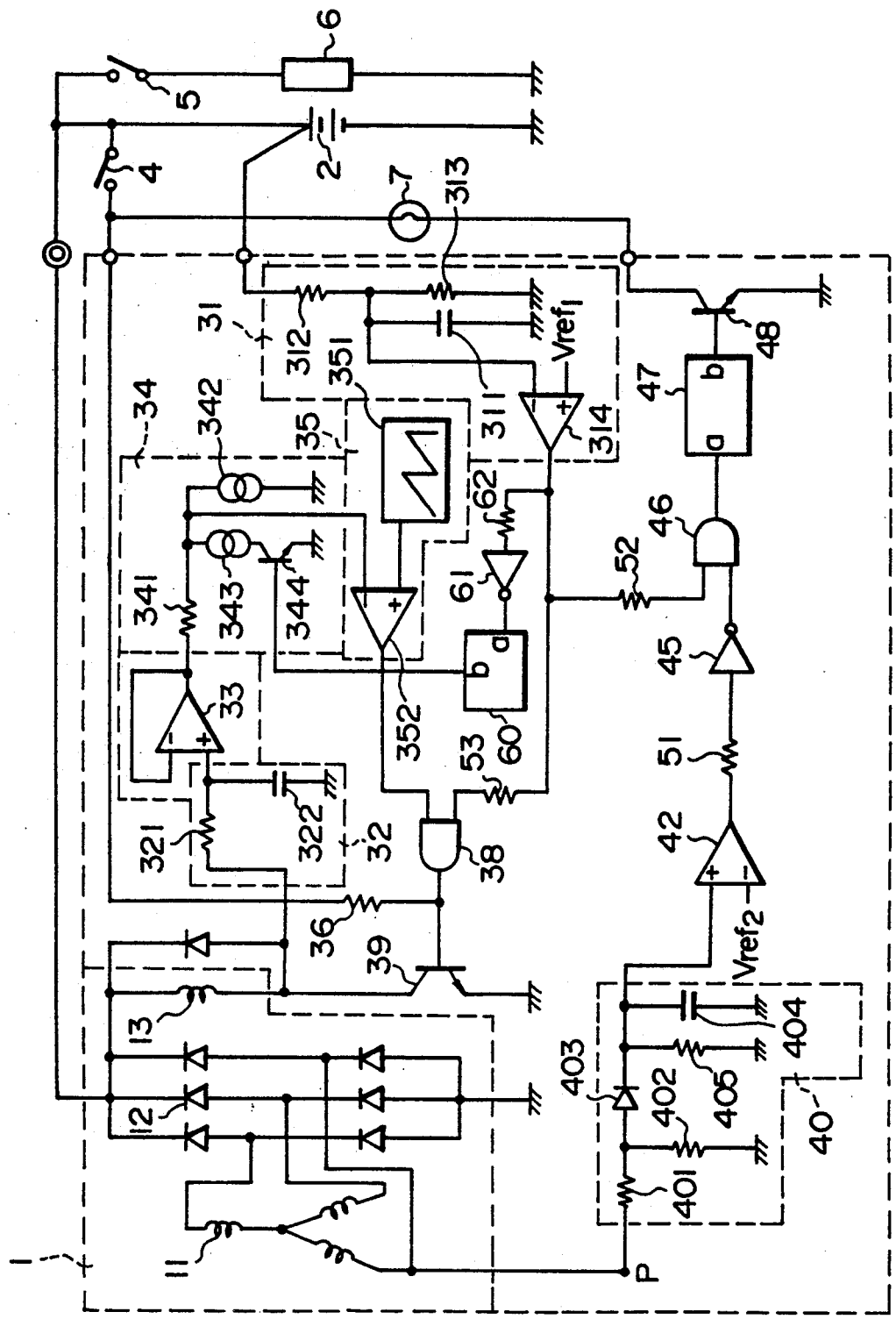
FIG. 9 is an electric circuit diagram showing a fourth embodiment of an apparatus of the present invention.

As shown in FIG. 9, the constant current source 343 is connected in parallel with the constant current source 342, and is connected to a collector of a transistor 344. The output of the load cut-off detecting circuit 60 is connected to the base of the transistor 344.

With the construction described above, the output of the load cut-off detecting circuit 60 is low level as described previously under a state of a constant load. Thus, the transistor 344 is in an OFF state. When a large electric load is cut off, the change-over circuit 60 outputs a high level signal. Then, the transistor 344 is turned on and hence the output of the maximum signal generating circuit 35 becomes a high ON-duty signal. Then, the battery voltage drops to assume the first predetermined value $V_{R1}$ and below. During a predetermined time after the generator starts electric generation, the output transistor 39 is controlled with a high ON-duty factor by a constant current source 343, the current flowing through the field winding is increased rapidly, and the voltage of the stator winding 11 rises to assume the second predetermined value $V_{R2}$ and above within the delay time. After the lapse of a predetermined time, the output of the load cut-off detecting circuit 60 becomes low level, and the transistor 344 is turned OFF. Therefore, the output transistor 39 is controlled to operate at a low ON-duty factor by the constant current source 342, and the current flowing through the field winding 13 increases gradually.

In the first and the second embodiments, the ON-duty factor of the output transistor 39 is controlled high until the generator voltage reaches the third predetermined value $V_{R3}$ and above as described above. On the contrary, in the third and the fourth embodiments, the ON-duty factor of the transistor 39 is controlled high only for a predetermined time. In the third embodiment, the ON-duty factor for a predetermined time is set to 100%, and in the fourth embodiment, the ON duty factor for a predetermined time is increased gradually, for example, from a high ON-duty factor of 50%.

Figure 11:
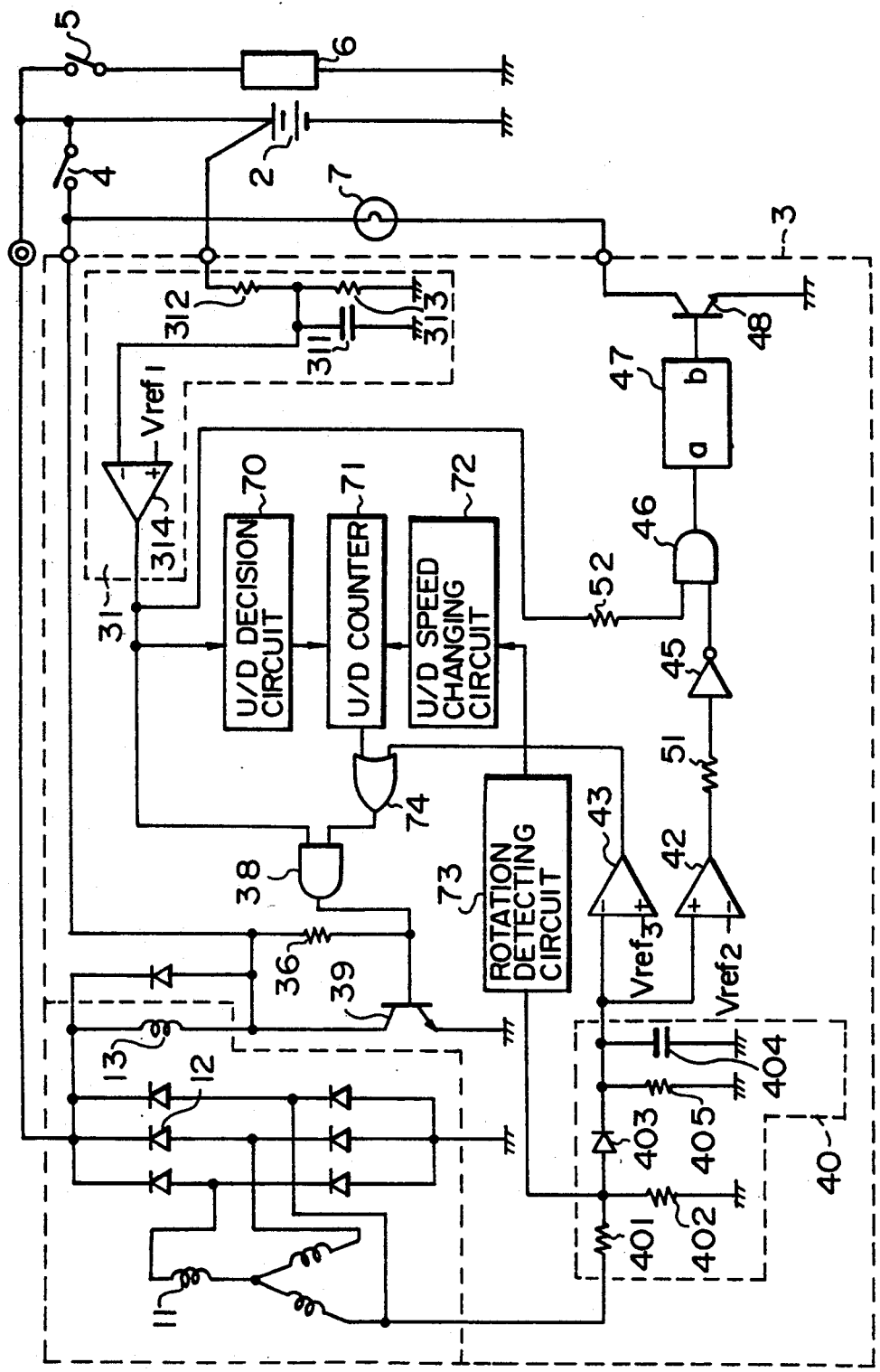
FIG. 11 is an electric circuit diagram showing a fifth embodiment of an apparatus of the present invention.

Next, a fifth embodiment will be described based on FIG. 11. In the fifth embodiment, the conduction rate of the output transistor 3 is increased gradually, thereby to increase the current flowing through the field winding 13 gradually similarly to the first through the fourth embodiments by the use of an up/down decision circuit 70 (hereinafter referred to as a U/D decision circuit 70), an up/down counter 71 (hereinafter referred to as a U/D counter 71) and an up/down speed changing circuit 72 (hereinafter referred to as a U/D speed changing circuit 72). That is, in this fifth embodiment, the excitation control means is constituted by the U/D decision circuit 70, the U/D counter 71 and the U/D speed changing circuit 72. The construction and the operation described above are disclosed in detail in U.S. Pat. No. 4,636,706 (corresponding to JP-A-62-64299). Hence, the operation will be described briefly here. Here, the fifth embodiment is an improvement of the above-mentioned citation.

The U/D decision circuit 70 sends a signal for increasing a count value of the U/D counter 71 through the U/D decision circuit 70 by means of a high level signal when the voltage of the battery 2 is at the first reference voltage $V_{ref1}$ and below which reference voltage $V_{ref1}$ correspond to the first predetermined value $V_{R1}$ for instance, in accordance with the output of the comparator 314.

The U/D counter 71 increases or decreases the count value in accordance with the signal of the U/D decision circuit 70 while determining the period of increase or decrease by the signal of the U/D speed changing circuit 72.

A rotation detecting circuit 73 detects the engine speed by means of a signal from a generator output voltage detection circuit 40 which detects the output voltage of a generator driven by the engine, and sends a high level signal to the U/D speed changing circuit 72 when it is determined that the engine speed is lower than a predetermined value (for example, 1,000 rpm). It is arranged to change an output of the U/D counter 71 slowly by elongating the counting up or down period of the U/D counter 71 by the high level signal.

Thus, when the engine speed is lower than a predetermined value, the conduction rate of the transistor 39 is increased gradually by increasing the count value of the U/D counter 71 slowly when the voltage of the battery 2 becomes the first predetermined value $V_{R1}$ and below.

On the hand, when the engine speed is higher than a predetermined value, the rotation detecting circuit 73 outputs a low level signal. With this, the U/D speed changing circuit 72 changes the output of the U/D counter 71 suddenly by reducing the counting up or down period of the U/D counter 71.

Further, similarly to the first embodiment, the comparator 43 outputs a high level signal to an OR circuit 74 when the generator voltage becomes the third reference voltage $V_{ref3}$ and below. With this, the output transistor 39 is brought into an ON state. Thus, the current flowing through the field winding 13 is increased rapidly, and the voltage of the stator winding 11 rises to the second predetermined value $V_{R2}$ and above within the delay time. Therefore, the charge charging abnormality lamp 7 is not turned on.

Further, in this fifth embodiment, the combination of the AND circuit 38, the comparator 43 and the OR circuit 74 constitutes a change-over circuit.

Figure 12:
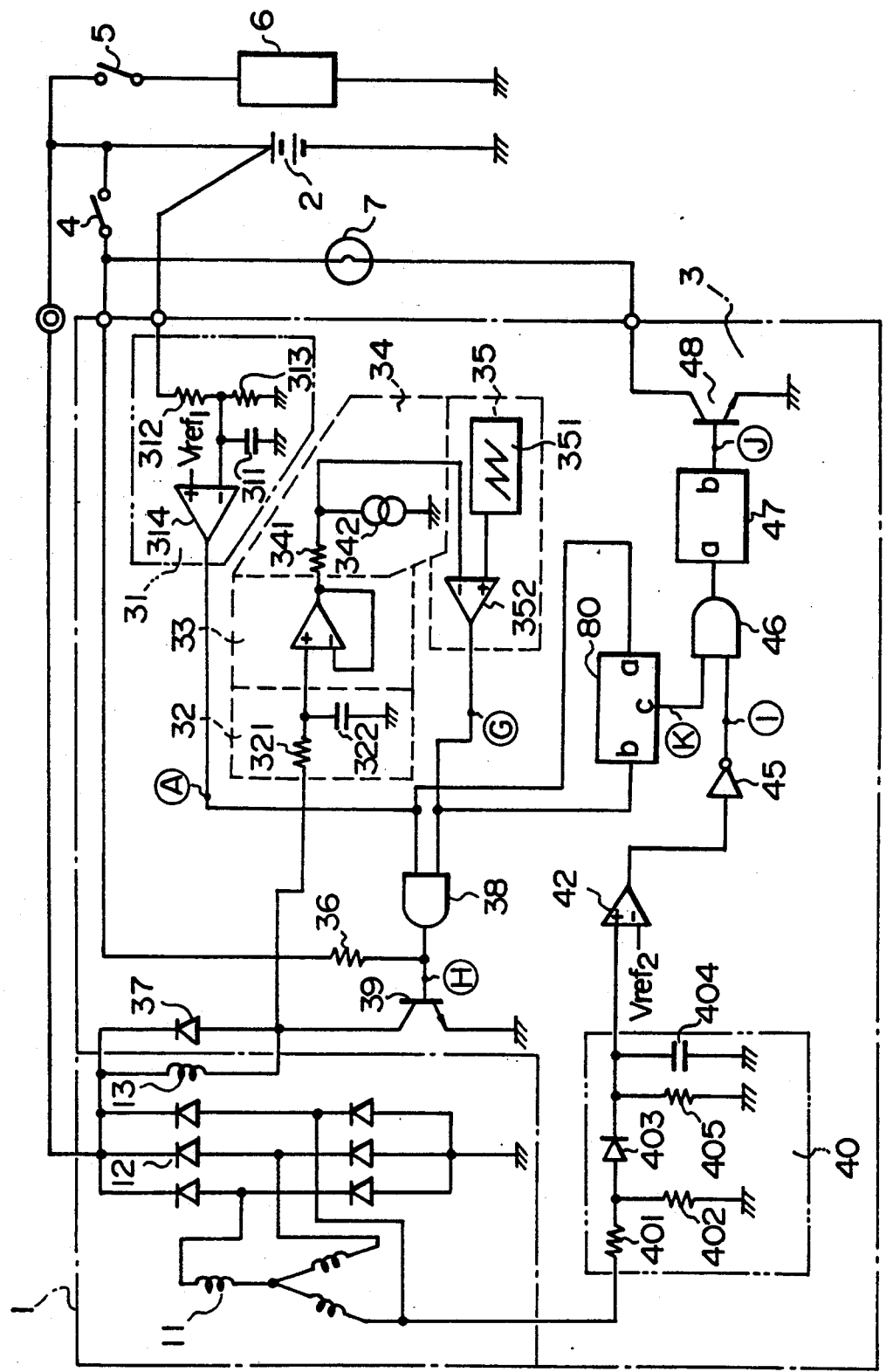
FIG. 12 is an electric circuit diagram showing a sixth embodiment of an apparatus of the present invention.

Next, a sixth embodiment will be described with reference to FIG. 12 through FIG. 14.

Also, in this sixth embodiment, the excitation control means is constituted by the mean conduction rate detection circuit 32, the impedance converter circuit 33, the voltage reducing circuit 34 and the maximum signal generating circuit.

In the sixth embodiment, an output terminal c of a gradual excitation signal detecting circuit 80, which detects a signal which increases the field current gradually, is connected to an AND circuit 46.

Figure 13:
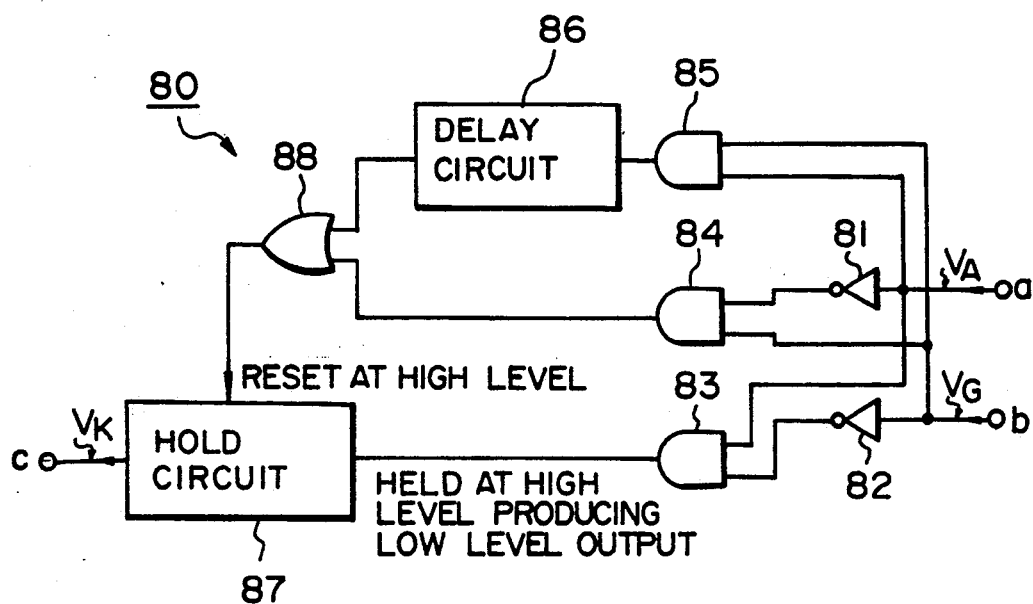
FIG. 13 an electric circuit diagram showing a gradual excitation signal detecting circuit of the sixth embodiment.

This gradual excitation signal detecting circuit 80 has an input terminal a, to which the output of the comparator 314 of the voltage control circuit 31 is inputted, and an input terminal b, to which the output of the maximum signal generating circuit 35 is inputted, as shown in FIG. 13. Further, the gradual excitation signal detecting circuit 80 is composed of inverters 81 and 82, AND circuit 83, 84 and 85, a delay circuit 86, a hold circuit 87 and an OR circuit 88.

This gradual excitation signal detecting circuit 80 inputs the output of the voltage control circuit 31 and the output of the maximum signal generating circuit 35 to a terminal a and a terminal b, respectively. Since the output signal $V_G$ of the maximum signal generating circuit 35 is larger than the output Signal $V_A$ of the voltage control circuit 31 in an ordinary state, the output signal $V_A$ is low level when the output voltage $V_G$ is low level. Accordingly, the output of the AND circuit 83 is low level, and the hold circuit 87 outputs a high level signal. Similarly, when the output signal $V_G$ is high level, the output of the AND circuit 83 is always low level. Thus, an output signal $V_K$ of the gradual excitation signal detecting circuit 80 is high level, as shown in FIG. 14 (f).

When the battery voltage drops to the first predetermined value $V_{R1}$ and below after cutting off the load, however, the output Signal $V_A$ of the voltage control circuit 31 continues to stay at high level. Then, when maximum signal generating circuit 35 outputs the voltage signal $V_G$ of low level, the AND circuit 83 outputs a high level signal. With this, the AND circuit 83 is held and outputs a high level signal signal (FIG. 14 (f)). Further, when the maximum signal generating circuit 35 produces the output signal $V_G$ of high level, the AND circuit 85 outputs a high level signal. However, the delay circuit 86 continues to output a low level signal for a predetermined time, and hence the hold circuit 87 is not reset, but continues to output a low level output signal $V_K$.

Thereafter, when the battery voltage is recovered and exceeds the first predetermined value $V_{R1}$, the output signal $V_G$ of the maximum signal generating circuit 35 becomes larger than the output signal $V_A$ of the voltage control circuit 31. In other words, the output signal $V_G$ becomes high level and the output signal $V_A$ becomes low level. Then, the AND circuit 84 outputs a high level signal and the OR circuit 88 also outputs a high level signal. Then, the hold circuit 87 is reset and outputs the output signal $V_K$ of high level.

Referring to FIG. 14, when a large electric load is discontinued as shown in FIG. 14 (a), the battery voltage is increased as shown in the first embodiment. Thus, the output signal $V_A$ of the voltage control circuit 31 becomes low level as shown in FIG. 14 (b). Further, the control voltage $V_H$ of the output transistor 39 also becomes low level as shown in FIG. 14 (d), and the generator voltage drops. When the generator voltage drops to assume the second predetermined value $V_{R2}$ and below, the comparator 42 outputs a low level signal, and the output $V_I$ of the inverter 45 becomes high level, as shown in FIG. 14 (e).

On the other hand, when the battery voltage drops to the first predetermined value $V_{R1}$ and below, the output signal $V_A$ of the voltage control circuit 31 is converted to a high level signal. Simultaneously with above, the AND circuit 38 outputs a signal of the 10% ON-duty factor of the output signal $V_G$ of the maximum signal generating circuit 35 as a control signal $V_H$ of the output transistor 39, as shown in FIG. 14 (d).

Further, the gradual excitation signal detecting circuit 80, receives the high level output signal $V_A$ of the voltage control circuit 31 from the input terminal a and the output signal $V_G$ of the 10% ON-duty factor of the maximum signal generating circuit 35 from the input terminal b. When the signal of the 10% ON-duty factor is in an OFF state, the output of the AND circuit 83 becomes high level, and the output of the hold circuit 87 becomes low level. When the signal of the 10% ON-duty factor is in an ON state, the OR circuit 88 continues to always output a low level signal by means of the delay circuit 86 (FIG. 14 (f)). Thus, the gradual excitation signal detecting circuit 80 can detect that a signal which increases the field current gradually is being outputted by detecting that the output signal $V_G$ of the maximum signal generating circuit 35 is smaller than the output signal $V_A$ of the voltage control circuit 31.

The output of the AND circuit 46 also becomes a low level signal by a low level output signal $V_K$ of the gradual excitation signal detecting circuit 80. Thus, the delay circuit 47 is kept to output a low level signal continuously (FIG. 14 (g)), thereby maintaining the transistor 48 in an OFF state.

To be more precise, in the sixth embodiment, when the generator voltage has the second predetermined value $V_{R2}$ and below and a signal which increases the field current gradually is being outputted, the signal supplied to the transistor 48 is cancelled so as to prevent lighting of the warning lamp 7 forcibly.

Incidentally, since the generator voltage has the second predetermined value $V_{R2}$ and below when the generator has gone wrong, the output $V_J$ of the inverter 45 is high level. Further, the ON-duty factor of the output transistor 39 increases gradually to reach 10%. Then, the output signal $V_A$ of the voltage control circuit 31, which is applied to the input terminal a of the gradual excitation signal detecting circuit 80, and the output signal $V_G$ of the maximum signal generating circuit 35, which is applied to the input terminal b thereof, coincide with each other, and the gradual excitation signal detecting circuit 80 outputs a high level output signal $V_K$. Then the AND circuit 46 outputs a high level signal, and turns the transistor 48 ON after a predetermined time provided by the delay circuit 47. With this, it is possible to inform an operator of an unusual state of the generator by lighting the warning lamp 7.

We claim:

1. A charging control apparatus for a vehicle generator having a stator winding and a field winding and driven by an engine to generate an output voltage for charging a battery, said apparatus comprising:
   switching means, connected to said field winding, for controlling a current flowing through said field winding;
   means for monitoring a voltage of said battery;
   voltage control means, responsive to said monitoring means, and connected to said switching means for receiving a first reference voltage and comparing said battery voltage with said first reference voltage, and for producing a controlling output for controlling said switching means to gradually increase the current flowing through said field winding at a first rate when the battery voltage drops to be lower than the first predetermined voltage;
   generator output voltage detecting means, connected to an output of said generator, for detecting an output voltage of said generator;
   charging abnormality warning means, connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating that the battery voltage is at the first reference voltage or below and for delaying said first signal for a predetermined time to produce a delayed first signal, said indication produced when said generator output voltage is at or lower than said second predetermined voltage, and said delayed first signal is produced; and
   current increasing means coupled between said voltage control means and said switching means and receiving said controlling output of said voltage control means, for driving said switching means at an amount in accordance with said controlling output of said voltage control means, and for increasing an amount of driving of said switching means to increase the current flowing through said field winding to an increased rate higher than said first rate to thereby increase the generator output voltage to exceed the second predetermined voltage within said predetermined time, when the generator output voltage drops to the second predetermined voltage or lower and the battery voltage drops to the first reference voltage or lower.

2. A charging control apparatus for a vehicle generator which has a stator winding and a field winding and which is driven by an engine to generate an output voltage for charging a battery, said apparatus comprising:
   switching means, connected to said field winding, for controlling a current flowing through said first winding;
   means for monitoring a voltage of said battery;
   voltage control means, responsive to said monitoring means, and connected to said switching means, for receiving a first reference voltage and comparing said battery voltage with said first reference voltage, and for outputting a control signal which controls an ON/OFF state of said switching means at a first rate to maintain the battery voltage at a predetermined value;
   excitation control means, for producing a drive signal for said switching means that will increase the current flowing through said field winding to an increased rate higher than said first rate of increase;
   generator output voltage detecting means connected to an output of said generator, for detecting an output voltage of said generator;
   charging abnormality warning means, connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating that the battery voltage is at the first predetermined voltage or below and for delaying said first signal for a predetermined time to produce a delayed first signal, said indication produced when said generator output voltage is at or lower than said second predetermined voltage, and said delayed first signal is produced; and change-over means receiving said control signal from said voltage control means and receiving said drive signal from said excitation control means, for driving said switching means at an amount in accordance with said output of said voltage control means, and for increasing an amount of driving of said switching means to increase the current flowing through said field winding to said increased rate higher than said first rate to thereby increase the generator output voltage to exceed the second predetermined value within the predetermined time by controlling said switching means using the control signal of said voltage control means in place of the control signal of said excitation control means, when the generator output voltage drops to the second predetermined voltage and below and the battery voltage drops to the first reference voltage and below.

3. A charging control apparatus for a vehicle generator which has a stator winding and a field winding and which is driven by an engine to generate an output voltage for charging a battery, said apparatus comprising:

switching means, connected to said field winding, for controlling a current flowing through said field winding;

means for monitoring a voltage of said battery;

voltage control means, responsive to said monitoring means, and connected to said switching means, for receiving a first reference voltage and comparing said battery voltage with said first reference voltage, and for outputting a control signal which controls an ON/OFF state of said switching means at a first rate to maintain the battery voltage at a predetermined value;

excitation control means for producing a drive signal for said switching means that will increase the current flowing through said field winding to an increased rate higher than first rate of increase;

generator output voltage detecting means connected to an output of said generator, for detecting an output voltage of said generator;

charging abnormality warning means, connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating the battery voltage is at the first reference voltage or below and delaying said first signal for a predetermined time to produce a delayed first signal, said indication produced when said generator output voltage is at or lower than said second predetermined voltage, and said delayed first signal is produced; and change-over means receiving said control signal from said voltage control means and receiving said drive signal from said excitation control means, for driving said switching means at an amount in accordance with said output of said voltage control means, and for increasing an amount of driving of said switching means to increase the current flowing through said field winding to said increased rate higher than said first rate to thereby increase the generator output voltage to exceed the second predetermined value within the predetermined time by controlling said switching means using the control signal of said voltage control means in place of the control signal of said excitation control means, when the generator output voltage drops to the second predetermined value and below and the battery voltage drops to the first predetermined value and below, where said cross-over means includes means for receiving third voltage higher than said second predetermined voltage and means for comparing the output voltage of said generator with said third voltage, said change-over means controls said switching means using the control signal of said excitation control means after the output voltage of said generator has reached said third voltage.

4. A charging control apparatus for a vehicle generator which has a stator winding and a field winding and which is driven by an engine to generate an output voltage for charging a battery, said apparatus comprising:

switching means, connected to said field winding, for controlling a current flowing through said first winding;

means for monitoring a voltage of said battery;

voltage control means, responsive to said monitoring means, and connected to said switching means for receiving a first reference voltage and comparing said battery voltage with said first reference voltage, and for outputting a control signal which controls an ON/OFF state of said switching means at a first rate to maintain the battery voltage at a predetermined value;

excitation control means for producing a drive signal for said switching means that will increase the current flowing through said field winding to an increased rate higher than said first rate;

generator output voltage detecting means connected to an output of said generator, for detecting an output voltage of said generator;

charging abnormality warning means, connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating the battery voltage is at the first reference voltage or below and delaying said first signal for a predetermined time to produce a delayed indication, said indication produced when said generator output voltage is at or lower than said second predetermined voltage, and said delayed first signal is produced; and change-over means receiving said control signal from said voltage control means and receiving said drive signal from said excitation control means, for driving said switching means at an amount in accordance with said output of said voltage control means, and for increasing an amount of driving of said switching means to increase the current flowing through said field winding to said increased rate higher than said first rate to thereby increase the generator output voltage to exceed the second predetermined value within the predetermined time by controlling said switching means using the control signal of said voltage control means in place of the control signal of said excitation control means, when the generator output voltage drops to the second predetermined value and below and the battery voltage drops to the first predetermined value and below, said change-over means performing a change-over operation to control said switching means using a control signal of said voltage control means in place of the control signal of said excitation control means for a predetermined time, when the output voltage of said generator drops to the second predetermined voltage and below.

5. A charging control apparatus for a vehicle generator having a stator winding and a field winding and driven by an engine to generate an output voltage for charging a battery, said apparatus comprising:

switching means, connected to said field winding, for controlling a current flowing through said field winding;

means for monitoring a voltage of said battery;

voltage control means, responsive to said voltage from said monitoring means, and connected to said switching means, for receiving a first reference voltage and comparing said battery voltage with said first reference voltage, and outputting a control signal which controls an ON/OFF state of said switching means at a first rate to maintain the battery voltage at a first predetermined value;

excitation control means, for producing a drive signal for said switching means that will increase the current flowing through said field winding to an increased rate higher than said first rate;

generator output voltage detecting means connected to an output of said generator, which detects an output voltage of said generator;

charging abnormality warning means, connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating the battery voltage is at the first predetermined value or below and delaying said first signal for a predetermined time to produce a delayed first signal, said indication produced when said generator output voltage is at or lower than said second predetermined voltage, and said delayed first signal is produced; and change-over means, receiving outputs of said excitation control means, said voltage control means and said generator output voltage detecting means, for driving said switching means using the control signal of said voltage control means in place of the control signal of said excitation control means when the generator output voltage drops to a third predetermined value and below, said change over means including means for comparing the generator output voltage from said generator output voltage detecting means with said third predetermined voltage which is higher than the second predetermined voltage but lower than the first reference voltage.

6. A charging control apparatus for a vehicle generator having a stator winding and a field winding and driven by an engine to generate an output voltage for charging a battery, said apparatus comprising:

switching means, connected to said field winding, for controlling a current flowing through said field winding;

means for monitoring a voltage of said battery;

voltage control means, responsive to said voltage from said monitoring means, and connected to said switching means for receiving a first reference voltage and comparing said battery voltage with said first reference voltage, and for generating a control signal for controlling said switching means to gradually increase the current flowing through said field winding at a first rate to thereby maintain the battery voltage at the first predetermined value when the battery voltage drops lower than the first predetermined value;

generator output voltage detecting means connected to an output of said generator, for detecting an output voltage for said generator;

charging abnormality warning means connected to said generator output voltage detecting means, for detecting a charging abnormality and producing an indication to inform an operator of the charging abnormality, including means for receiving a second predetermined voltage lower than said first reference voltage and comparing the generator output voltage detected by said generator output voltage detecting means therewith, and means coupled to said comparing means of said voltage control means for receiving a first signal indicating the battery voltage is at the first predetermined value or below and delaying said first signal for a predetermined time to produce a delayed first signal, said indication produced when said generator output voltage is at or lower than said second predetermined voltage, and said delayed first signal is produced; and erroneous operation preventing means for preventing an erroneous operation of said charging abnormality warning means from occurring while the control signal of said voltage control means is outputted, even when the occurrence of a charging abnormality is detected.

7. An apparatus as in claim 1 wherein said gradual control by said voltage control means is by adjustment of its duty cycle.

8. An apparatus as in claim 6 wherein said gradual control by said voltage control means is by adjustment of its duty cycle.

* * * * *